United States Patent
Anson

[19]

[11] Patent Number: 6,155,158
[45] Date of Patent: Dec. 5, 2000

[54] BEVERAGE BREWING SYSTEM

[75] Inventor: James H. Anson, Auburn, Ill.

[73] Assignee: Bunn-O-Matic Corporation, Springfield, Ill.

[21] Appl. No.: 09/415,836

[22] Filed: Oct. 12, 1999

[51] Int. Cl.[7] ................................................. A47J 31/00
[52] U.S. Cl. ........................... 99/280; 99/289 R; 99/290; 99/291; 99/300; 99/323.3
[58] Field of Search .............................. 99/290, 280, 291, 99/284, 289 R, 300, 275, 323.3; 222/146.1, 146.2, 146.5

[56] References Cited

U.S. PATENT DOCUMENTS

| | | |
|---|---|---|
| Re. 25,663 | 10/1964 | Bunn . |
| 3,034,417 | 5/1962 | Bunn . |
| 3,149,556 | 9/1964 | Martin . |
| 3,371,593 | 3/1968 | Price . |
| 3,593,650 | 7/1971 | Martin . |
| 3,691,933 | 9/1972 | Martin . |
| 3,793,934 | 2/1974 | Martin . |
| 4,309,939 | 1/1982 | Stover . |
| 4,464,981 | 8/1984 | Stover . |
| 4,579,048 | 4/1986 | Stover . |
| 4,745,852 | 5/1988 | Sager .......................................... 99/280 |
| 4,790,239 | 12/1988 | Hewitt .................... 99/291 X |
| 4,971,259 | 11/1990 | Nidiffer . |
| 5,111,969 | 5/1992 | Knepler . |
| 5,134,925 | 8/1992 | Bunn et al. . |
| 5,158,793 | 10/1992 | Helbling ............................... 99/291 X |
| 5,186,394 | 2/1993 | Knepler et al. . |
| 5,230,278 | 7/1993 | Bunn et al. . |
| 5,255,593 | 10/1993 | Bunn et al. . |
| 5,303,639 | 4/1994 | Bunn et al. . |
| 5,309,819 | 5/1994 | Ford . |
| 5,375,508 | 12/1994 | Knepler . |
| 5,386,944 | 2/1995 | Knepler et al. . |
| 5,462,236 | 10/1995 | Knepler . |
| 5,465,650 | 11/1995 | Friedrich et al. . |
| 5,522,556 | 6/1996 | Knepler et al. . |
| 5,644,972 | 7/1997 | Dahmen et al. ....................... 99/290 X |

Primary Examiner—Reginald L. Alexander
Attorney, Agent, or Firm—Trexler, Bushnell, Giangiorgi & Blackstone, Ltd.

[57] ABSTRACT

An automatic beverage brewing apparatus is described. The automatic beverage brewing apparatus includes a controllable brewing device and a controllable brewing substance dispenser communicating with the brewing device. The automatic beverage brewing apparatus includes a housing in which at least one receptacle is retained proximate the brewing device for receiving brewed beverage from the brewing device. A plurality of controllable dispense valves are provided for controlling the flow of brewed beverage from the brewing device to the receptacles. Each receptacle includes a controllable outlet valve for automatically dispensing brewed beverage from the receptacle and a controllable disposal valve for automatically emptying the receptacle of brewed beverage. Each receptacle is supported on a weight sensing device which generates a weight control signal relating to the weight of brewed beverage retained in the receptacle. A controller receives the weight control signals and determines in response to each weight control signal the volume of brewed beverage retained within in a receptacle. The controller operates the dispensing valves, controllable outlet valves, and controllable disposal valves in accordance with the determined volumes.

18 Claims, 4 Drawing Sheets

BEVERAGE BREWING SYSTEM

RELATED APPLICATIONS

This invention uses a weight sensing device described in U.S. Pat. No. 5,386,944, issued Feb. 7, 1995, entitled "Weight Controlled Grinder And Method Of Grinding Coffee Beans," a system described in U.S. application Ser. No. 09/057,463 filed Apr. 8, 1998, entitled "Beverage Server," and a control system described in U.S. Pat. No. 5,375,508, entitled "Digital Brewer Control," the disclosures of which are hereby incorporated by reference. U.S. Pat. No. 5,386,944, U.S. patent application Ser. No. 09/057,463, and U.S. Pat. No. 5,375,508 are all assigned to the Assignee of the present application.

BACKGROUND TO THE INVENTION

This invention relates to an improved beverage brewing device and in particular to a beverage brewing device which fully automates the steps involved in beverage brewing operations.

The popularity of freshly brewed beverages has increased dramatically over recent years with the result that freshly brewed beverages form part of most restaurant menus. An additional result has been a substantial increase in the number of shops which primarily serve freshly brewed beverages, e.g., tea and coffee shops. In response to this increased demand for freshly brewed beverages, a variety of beverage brewing apparatuses which automate some of the steps involved in beverage brewing operations have been developed. For example, coffee machines in which hot water is automatically introduced into a brewing compartment containing a disposable filter and a measured quantity of coffee grounds are well known. Similarly, coffee machines which automatically grind a selected quantity of coffee beans and then dispense the ground beans into a brewing chamber are also widely known.

A problem exists with these and other prior art devices, however, in that an operator is still required to carry out several steps in order to produce a brewed beverage. For example, with many existing devices, an operator must still prepare a brewing funnel with filter paper, measure out a quantity of beverage brewing substance to place in the filter, and position the brewing funnel in the brewing apparatus. An operator may be required to start-up the machine, select a desired volume of beverage to be brewed, an amount of beverage brewing substance to be dispensed, initiate the brewing cycle, and then manually dispense servings of beverage from the brewing apparatus. Additionally, an operator must keep track of the age of a brewed beverage stored in the brewing apparatus, determine when the brewed beverage is too old for consumption, and then manually empty and clean the brewing apparatus. Moreover, an operator is required to monitor the inventory of brewed beverage retained in the brewing apparatus, and determine whether a refill operation should be performed.

The numerous steps that must be performed by an operator during beverage brewing operations reduce the efficiency and increase the cost of producing a brewed beverage. Additionally, the numerous steps that must be performed by an operator create many opportunities for errors to arise. For example, the necessity for an operator to activate the brewing apparatus and initiate the brewing cycle, means that if an operator is late to work, brewed beverage will not be ready in time to meet expected demand. Thus, the consequences of such tardiness can range in severity from customers irritated by the unexpected wait for their beverage to poor business reputation and loss of business. An operator could also incorrectly set the volume of beverage to be brewed, resulting in too much beverage brewed and wastage, or alternatively an insufficient amount of beverage brewed to meet demand. Similarly, an operator could incorrectly set the amount of beverage brewing substance to be used, which could adversely affect the taste of the brewed beverage. Additionally, the necessity for manual dispensing could result in spilling of the brewed beverage and wastage and/or inconsistency in the amount of beverage served, both of which are undesirable. Spillage also can create a mess around the serving area. The necessity for manual dispensing of brewed beverage also means that brewed beverage can be dispensed at inappropriate times. For example, beverage may be dispensed during the middle of a brewing cycle or when the brewing apparatus is being flushed out with water. Furthermore, given the typically busy environment in which brewed beverage (e.g., coffee) is typically prepared, operators may forget to monitor the age of the brewed beverage stored in the brewing apparatus, resulting in the possibility of less desirable beverage being served to a consumer. Operators may also forget to monitor the inventory of brewed beverage and initiate refill cycles, creating a delay before additional beverage is ready to be served.

OBJECTS AND SUMMARY OF THE INVENTION

Accordingly, it is a general object of the present invention to provide an automatic beverage brewing apparatus which substantially automates the steps involved in beverage brewing operations and substantially obviates operator intervention.

It is a related object of the present invention to provide an automatic beverage brewing apparatus capable of being preprogrammed to produce selected quantities of selected types of beverages at selected times of the day.

Another object of the present invention is to provide an automatic beverage brewing apparatus capable of monitoring the age and the volume of brewed beverage retained therein.

A further object of the present invention is to provide an automatic beverage brewing apparatus capable of automatically dispensing selected quantities of selected types of beverage.

An additional object of the present invention is to provide an automatic beverage brewing apparatus capable of automatically dumping the brewed beverage retained therein.

Another object of the present invention is to provide an automatic beverage brewing apparatus which automatically prevents dispensing of brewed beverage while predetermined operations are being carried out.

A further object of the present invention is to provide an automatic beverage brewing apparatus having a self-diagnostic capability.

Briefly, and in accordance with the foregoing, the present invention provides an automatic beverage brewing apparatus including a controllable brewing device and a controllable brewing substance dispenser communicating with the brewing device. The automatic beverage brewing apparatus also includes a housing, at least one receptacle retained on the housing proximate to the brewing device for receiving a brewed beverage therefrom and a weight sensing device coupled to each of the receptacles. Each of the weight sensing devices supports a receptacle and is adapted to sense the weight of brewed beverage retained within a receptacle and generate a weight control signal corresponding to the sensed weight. The weight sensing device is coupled to a controller. The controller receives the weight control signals and determines in response to each weight control signal the volume of brewed beverage retained within a receptacle.

The present invention also provides an automatic beverage brewing apparatus including a controllable brewing device, a controllable brewing substance dispenser communicating with the brewing device, and a housing. At least one receptacle is retained on the housing proximate to the brewing device for receiving a brewed beverage therefrom. A controllable outlet valve is coupled to and communicates with each of the receptacles for controllably dispensing a quantity of brewed beverage from the receptacle. A controllable disposal valve is coupled to and communicates with each of the receptacles for controllably emptying the receptacle of brewed beverage. A controller is coupled to the controllable outlet and disposal valves, said controller selectively operating the controllable outlet valves and the disposal valves in accordance with one of dispensing from and emptying the receptacles.

The present invention further provides an automatic beverage brewing apparatus including a controllable brewing device, at least one controllable brewing substance dispenser communicating with the brewing device for dispensing at least one type of brewing substance into the brewing device to produce at least one type of brewed beverage, and a housing. At least one receptacle is retained in the housing for receiving a brewed beverage from the brewing device and retaining the brewed beverage. A controllable dispensing valve is coupled to each of the receptacles for controlling the flow of brewed beverage from the beverage brewing device to a corresponding receptacle. An outlet valve is coupled to each of the receptacles. Each of the outlet valves is coupled to one of the receptacles for controllably dispensing a brewed beverage from the receptacle. A controller is coupled to the brewing device, the brewing substance dispensers, the dispensing valves and the outlet valves. The controller controllably operates the brewing substance dispensers, the brewing device and the dispensing valves so that a predetermined type of brewed beverage is dispensed to a predetermined receptacle.

BRIEF DESCRIPTION OF THE DRAWINGS

The present invention will now be described by way of example with reference to the accompanying drawings in which.

DETAILED DESCRIPTION OF A PREFERRED EMBODIMENT

Figure 1:
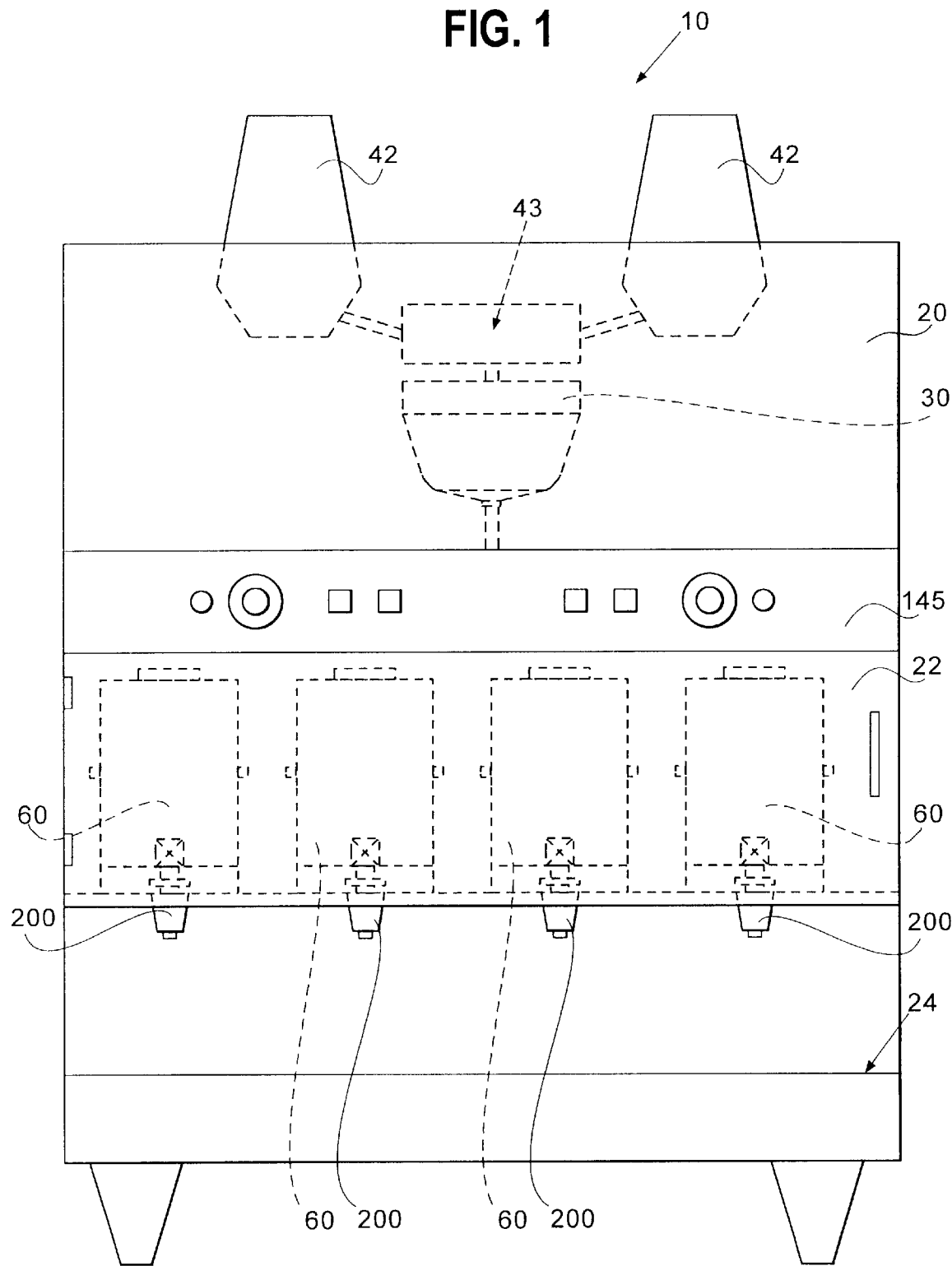
FIG. 1 is a diagrammatic front perspective view of an automatic beverage brewing apparatus according to the invention.

While the invention may be susceptible to embodiment in different forms, there is shown in the drawings, and will be described in detail, a specific embodiment with the understanding that the present disclosure is to be considered an exemplification of the principles of the invention, and is not intended to limit the invention to that as illustrated and described herein.

Turning now to the drawings, an automatic beverage brewing apparatus 10 according to the invention is illustrated in FIG. 1. As shown in FIG. 1, the automatic beverage brewing apparatus 10 includes a housing 20. The housing 20 retains a brewing device 30 and a brewing substance dispenser 40 operatively coupled to the brewing device 30. Although, a single brewing device 30 and brewing substance dispenser 40 are illustrated, it will be understood by those skilled in the art, that it may be desirable to provide two or more brewing devices 30 and or brewing substance dispensers 40. A water delivery system 50 (FIG. 7) is positioned generally adjacent the brewing substance dispenser 40 and brewing device 30 for delivering water to the brewing device 30.

Figure 5:
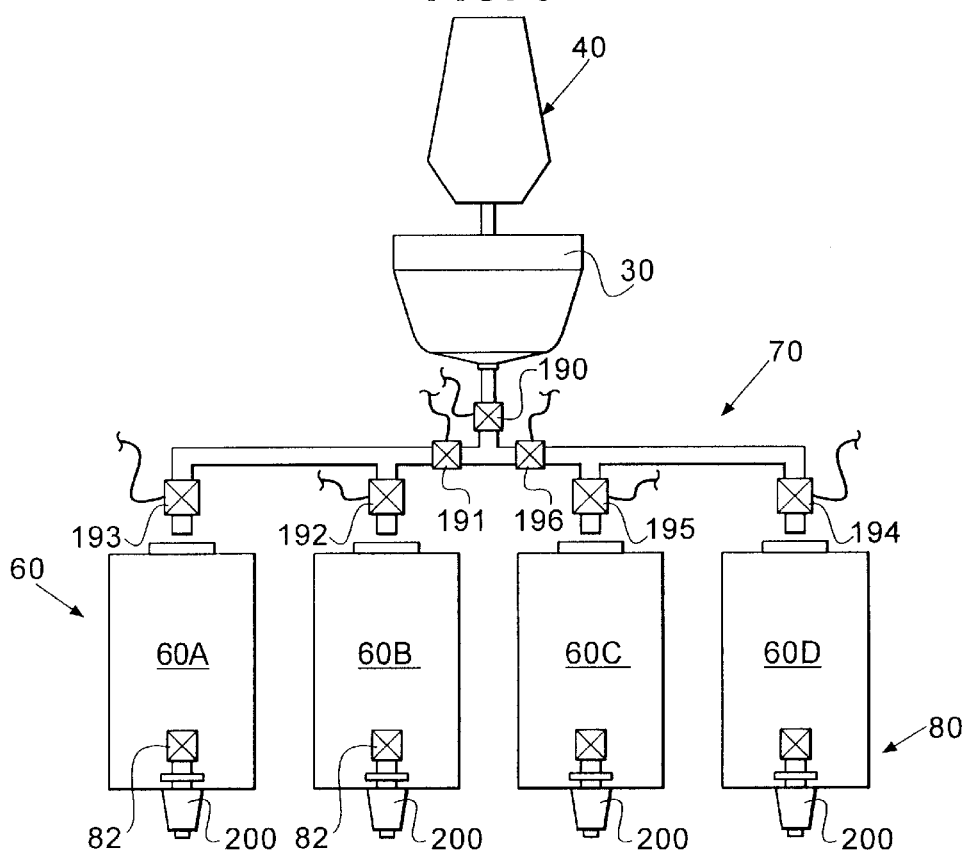
FIG. 5 is a diagrammatic front perspective view of the coupling of a brewing device to a plurality of receptacles in the automatic beverage brewing apparatus of the present invention.
Figure 7:
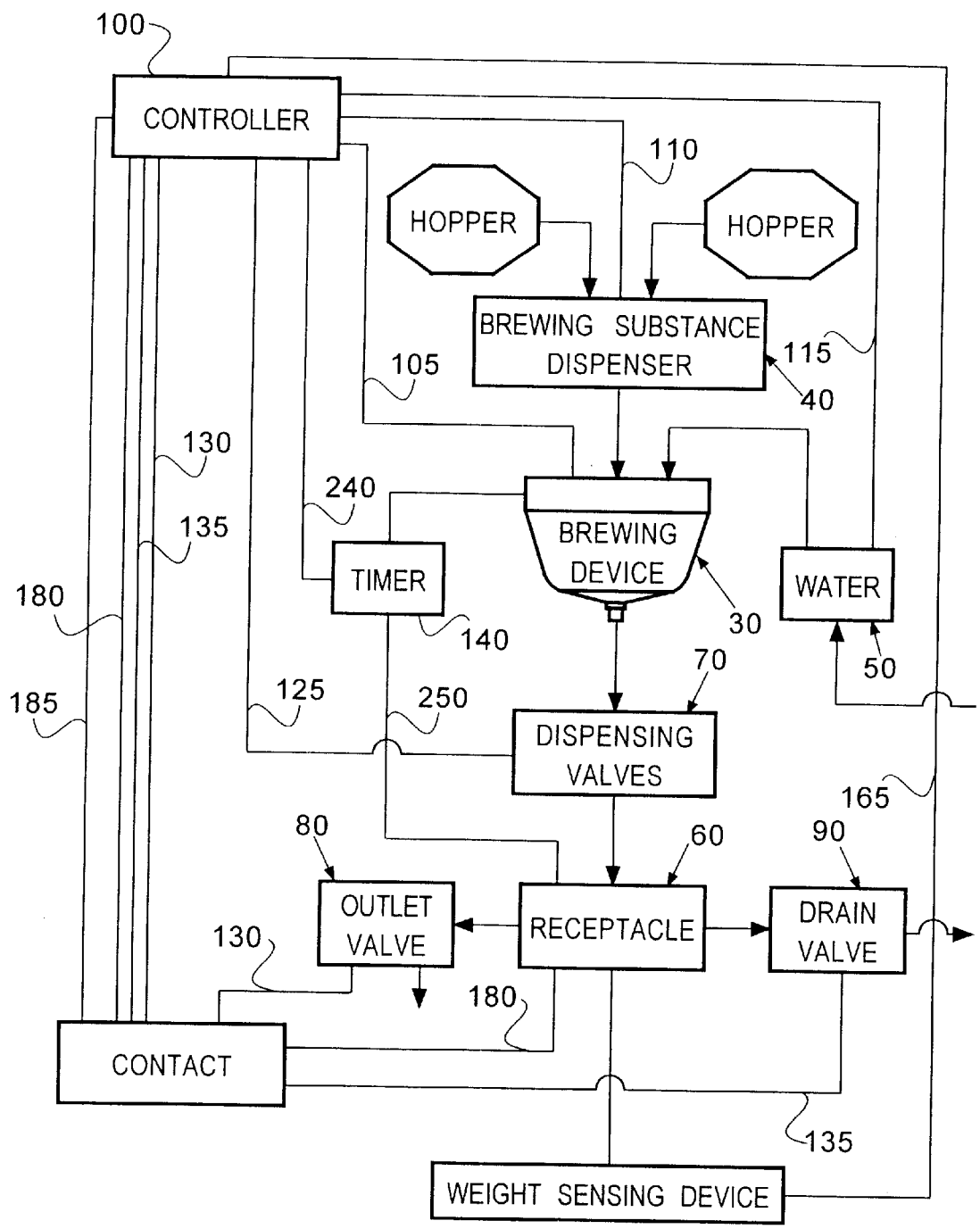
FIG. 7 is a schematic diagram of a control system according to the invention.

The automatic beverage brewing apparatus 10 also retains at least one receptacle 60 for storing selected types of brewed beverage ready for dispensing. In this regard, each receptacle 60 is retained on the housing proximate to the brewing device 30 for receiving a brewed beverage therefrom. As shown in FIGS. 5 and 7, a controllable dispense valve arrangement 70 couples the receptacles 60 to the brewing device 30. The controllable dispense valve arrangement 70 controls the flow of brewed beverage from the brewing device 30 to the receptacles 60. A controllable outlet valve arrangement 80 is also provided for controlling the dispensing or serving of brewed beverage from each of the receptacles 60. The automatic beverage brewing apparatus 10 also includes a controllable disposal valve arrangement 90 to which the receptacles 60 are operatively coupled. The controllable disposal valve arrangement 90 controls the draining or emptying of brewed beverage from the receptacles 60.

In the illustrated embodiment, the receptacles 60 are retained within the housing 20 and hidden behind a front panel unit 22 with front faucets 200 extending through the front panel unit 22. The front panel unit 22 is preferably openable to allow access to the interior of the housing 20 and to the receptacles 60. It is also preferred that four such receptacles 60 be provided. However, it will be apparent to those skilled in the art that it may be desirable to provide a greater number or a fewer number of receptacles 60 (e.g., one).

As will be discussed in greater detail hereinafter and indicated schematically in FIG. 7, the automatic beverage brewing apparatus 10 also includes a controller 100. The controller 100 is coupled to the brewing device 30, brewing substance dispenser 40, and water delivery system 50 via control lines 105, 110, 115 respectively. Similarly, the controller 100 is coupled to the first, second, and controllable disposal valve arrangements via control lines 125, 130, and 135 respectively. The controller 100 controllably operates the brewing device 30 brewing substance dispenser 40, and water delivery system 50 to produce selected quantities of selected types of brewed beverage. The controller 100 controllably operates the controllable dispense, outlet, and disposal valve arrangements 70, 80, 90 to control the quantity and type of brewed beverages that flows into and out of each of the receptacles 60. The controller 100 is also coupled to a timer 140 so that the time at which brewed beverage is produced is controlled. The timer 140 also allows the controller 100 to monitor the age of brewed beverage within a receptacle and control the flow of beverage into and out of a receptacle in accordance with the age. The controller 100 comprises a standard microprocessor of known construction having memory capabilities for storing preset selections, such as that described in U.S. Pat. No. 5,375,508, issued Dec. 27, 1994, and so details of its components will not be presented. The controller 100 may operate according to a predetermined program stored in its memory. Alternatively, the controller 100 may operate according to instructions entered manually through a control panel or keyboard 145 provided on the housing 20 (FIG. 1).

Figure 2:
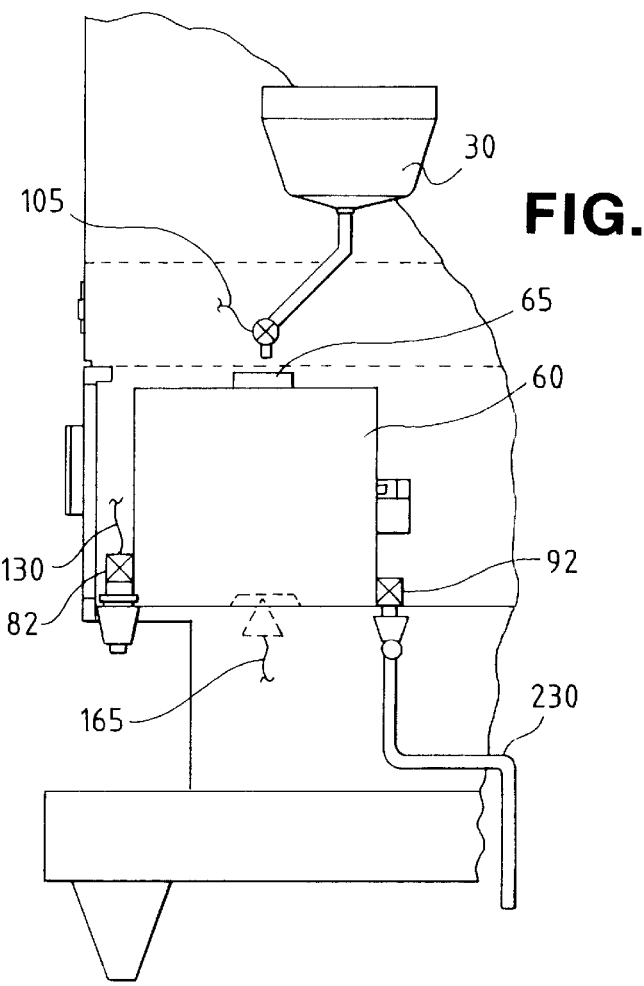
FIG. 2 is a diagrammatic, partial fragmentary, partial cross-sectional side elevational view of an automatic beverage brewing apparatus according to the invention.

Now that the general construction of the automatic beverage brewing apparatus 10 has been reviewed, the components of the automatic beverage brewing apparatus 10 will be described in greater detail. First, attention will be directed to the brewing substance dispenser 40 and brewing device 30. In this regard, reference is invited to FIGS. 1, 2, and 5.

As shown in FIG. 1, the dispenser 40 is positioned above the beverage brewing apparatus 10 so as to dispense a beverage brewing substance to the brewing device 30 in a gravity feed manner. The dispenser 40 includes at least one hopper 42 for storing at least one type of beverage brewing substance. In the illustrated embodiment, two such hoppers 42, each preferably retaining a different type of brewing substance (e.g., caffeinated and decaffeinated coffee beans) are shown. The dispenser 40 also preferably includes a grinder 43 in gravity feed relationship with the hoppers 42 so that beverage brewing substance such as whole bean coffee can be freshly ground and dispensed to the brewing device 30. An outlet port (not illustrated) is provided through which brewing substance is dispensed to the brewing device 30. Specifically, beverage brewing substance is fed from a selected one of the hoppers 42 into the grinder 43, which grinds the beverage brewing substance to a desired consistency and then dispenses the brewing substance through the outlet port. A motor and auger (not illustrated) are provided within each hopper 42 for driving the brewing substance out of the hopper 42 and delivering the brewing substance to the grinder 43.

As stated above, the brewing substance dispensed through the outlet port is deposited in the brewing device 30. The brewing device 30 is an infusion type assembly and includes a brew chamber. Heated water is introduced into the brewing device 30 once a selected quantity of brewing substance has been deposited therein. Infusion of the beverage brewing substance with the heated water produces a brewed beverage. The brewed beverage is dispensed through an outlet of the brewing device 30 to the receptacles 60. Both the beverage brewing substance dispenser 40 and the brewing device 30 are of generally known construction. They can be found, for example, in coffee brewers and grinders manufactured by Bunn-O-Matic Corporation, assignee of the present invention.

Attention will now be directed to the receptacles 60 of the present invention. In this regard, reference is invited to FIGS. 1, 2, and 3. As stated above and illustrated in FIG. 1, each of the receptacles 60 is retained within the housing 20 during normal use. Advantageously in the present invention each of the receptacles 60 is retained within the housing 20 on an individual scale or weight sensing device 150 (see FIG. 3). In this regard, each of the receptacles 60 is shaped to correspond to its weight sensing device 150. Specifically, each of the receptacles 60 includes a generally central recessed portion 62 adapted to fit over a raised portion 152 of the weight sensing device 150. The regions 63 of the receptacle 60 bordering the raised portion 152 also correspond to the regions 153 on the weight sensing device 150 so that each receptacle 60 is fully supported by its weight sensing device 150.

The complementary shaping of the weight sensing devices 150 and the receptacles 60 ensure that each receptacle 60 is securely mounted on its weight sensing device 150. Advantageously, the complementary shaping also ensures that each receptacle 60 is properly positioned and centered on its weight sensing device 150.

Although the receptacles 60 are retained within the housing 20 during normal use, the receptacles 60 are removable from the housing 20 to facilitate access to the interior of the housing 20, for example, during a maintenance or cleaning operation. As such, a bail handle (not illustrated) may be provided on each of the receptacles 60 for easy removal and handling of each of the receptacles 60.

As stated above, each of the receptacles 60 is adapted to receive a brewed beverage from the brewing device 30. In this regard, each of the receptacles 60 includes a permeable lid 65 through which liquid may be dispensed into the receptacle 60 from the brewing device 30. The permeable or brew-through lid 65 is of known construction as set forth in U.S. Pat. No. 4,739,898, issued Apr. 26, 1988 to Brown, and U.S. Pat. No. 5,480,054 issued Jan. 2, 1996 to Midden, both of which are hereby incorporated by reference. As discussed in these patents, the brew-through lid 65 enhances the safety and flavor retention of the receptacles 60.

Attention will now be directed to the weight sensing devices 150 of the present invention on which each of the receptacles 60 is mounted. Each of the weight sensing devices 150 includes a platform 155 for supporting a receptacle 60. The platforms 155 are each fitted with a load cell 160 for sensing changes in pressure applied to the platform 155. Because each weight sensing device 150 supports a receptacle 60 and a receptacle 60 is not removed from the weight sensing device 150 during normal use, changes in pressure applied to the load cell 160 result from changes of the weight of brewed beverage retained in a receptacle 60. Hence, each of the load cells 160 senses changes the change in the weight of brewed beverage retained in a receptacle 60, which result from dispensing of brewed beverage to or from a receptacle 60. The load cell 160 is of known construction as set forth in U.S. Pat. No. 5,380,944, issued Feb. 7, 1995, to which reference is again invited.

Each weight sensing device 150 is adapted to generate a weight control signal corresponding to the sensed weight of the receptacle 60 retained thereon. The weight control signals are transmitted to the controller 100 via control lines 165. The controller 100 receives the weight control signals and uses them in controlling the operation of the automatic beverage brewing apparatus 10.

Advantageously, the weight sensing devices 150 and weight control signals allow the controller 100 to monitor the inventory of brewed beverage retained within the receptacles 60. In particular, the controller 100 has stored within its memory the "tare" or empty weight of each receptacle 60 and so can determine from the received weight control signals, the actual weight of the beverage retained therein. In the preferred embodiment of the present invention, the controller 100 also has the densities of a variety of brewed beverages stored therein and is adapted to use the stored densities in conjunction with the determined weight to calculate the volume of beverage retained in a receptacle 60.

Thus, the weight sensing devices 150 allow the controller 100 to determine the volume of brewed beverage retained within each of the receptacles 60. The controller 100, in turn, is adapted to use the determined volumes as criteria for determining whether additional beverage should be brewed and if so what type of beverage should be brewed, to which receptacles 60 additional beverage should be dispensed, how much brewed beverage should be brewed by the brewing device 30, how much brewed beverage should be dispensed into a receptacle 60, whether brewed beverage should be dispensed from a receptacle 60, and a variety of other decisions in which volume is a determining factor.

Figure 4:
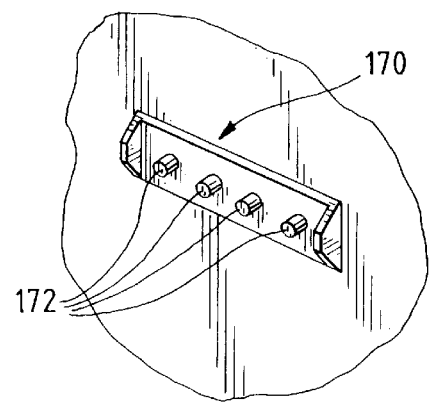
FIG. 4 is a perspective view of a contact used in the present invention.
Figure 3:
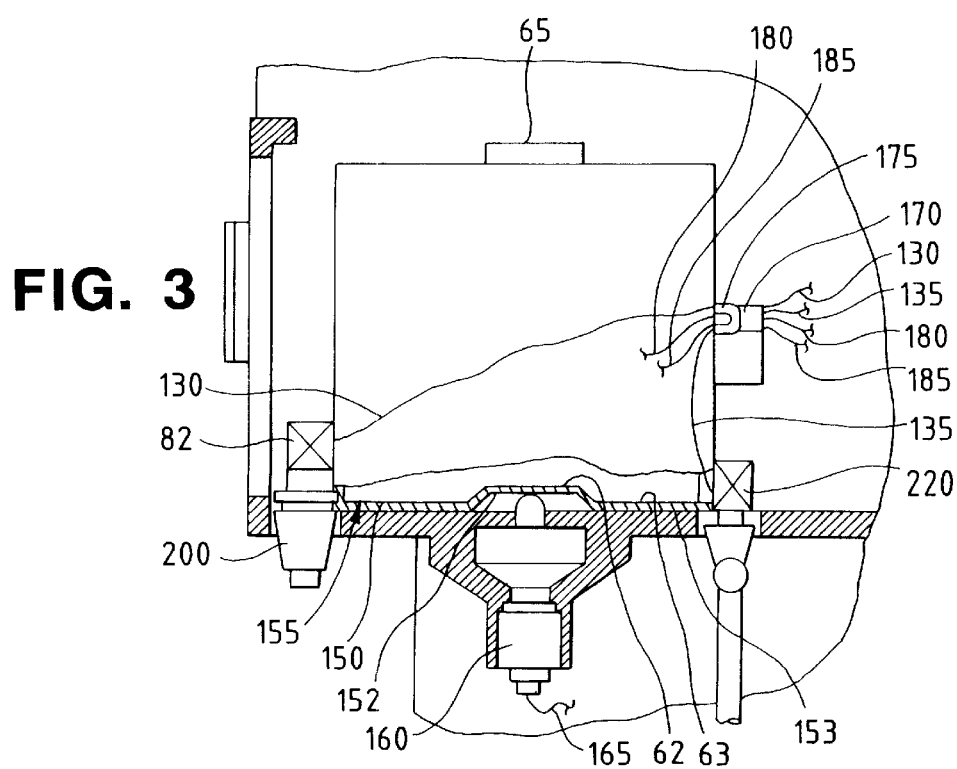
FIG. 3 is a diagrammatic, partial fragmentary, partial cross-sectional side elevational view of a receptacle and a weight sensing device used in the automatic beverage brewing apparatus of the present invention.

As shown in FIG. 3, each of the weight sensing devices 150 also includes a contact 170 retained thereon. The contacts 170 are provided on each of the weight sensing devices 150 for transmitting power from a power source (not illustrated) to the controller 100 and a heater (not illustrated) retained in each of the receptacles 60. The heaters are provided for warming the receptacles 60 and maintaining the brewed beverage within a receptacle 60 at a desired temperature. The contacts 170 fit into a socket 175 provided on the receptacles 60 to transmit power to the heaters. Specifically, as illustrated in FIG. 4, the contacts (not shown) 170 includes contact plungers 172 adapted for connection with contact pads on a receptacle 60. The contact 170 is of known construction as described in detail in U.S. patent application Ser. No. 09/057,463, filed Apr. 18, 1998 and assigned to the assignee of the present invention, to which reference is again invited. Advantageously the contact 170, in the present invention, also includes additional contact plungers 172 and the receptalcles 60 also include corresponding additional contact pads. The additional plungers 172 and pads are provided for delivering power to the second and controllable disposal valve arrangements 80, 90 respectively. Specifically, power is transmitted through a pad and contact 172 assembly through the control line 130 line to the controllable outlet valve arrangement 80, and through the control line 135 to the controllable disposal valve arrangement 90. It should be noted that by providing the contact 170 on the weight sensing device 150 the space requirements of the automatic beverage brewing apparatus 10 are reduced and the construction of the automatic beverage brewing apparatus 10 is simplified.

Each of the contacts 170 is coupled to the controller 100 via the control lines 130, 135, 180, 185. Coupling of the controller 100 to the contact 170 via the control line 185 allows the controller 100 to control the power supply to the heaters, controllable outlet valve arrangement 80, and controllable disposal valve arrangement 90. In particular, the controller 100 controls the power supply and hence the operation of the heater through control line 180. Likewise, the controller 100 controls the power supply to and hence operation of the controllable outlet valve arrangement 80 via control line 130. Similarly, the controller 100 controls the power supply to and hence operation of the controllable disposal valve arrangement 90 via control line 135.

Attention will now be directed to the controllable dispense, outlet, and disposal valve arrangements 70, 80, 90. In this regard, reference is invited to FIGS. 3, 5, 6 and 7.

As stated above, the dispensing valve arrangement 70 allows control of the flow of brewed beverage from the brewing device 30 to each of the receptacles 60. Specifically, the controllable dispense valve arrangement 70 allows the quantity of beverage dispensed to a receptacle 60 to be controlled and it also allows the receptacle or combination of receptacles 60 to which brewed beverage is dispensed to be controlled or selected. In the illustrated embodiment, the controllable dispense valve arrangement 70 comprises a plurality of dispensing valves 190, 191, 192, 193, 194, 195, 196. Preferably, each of the dispensing valves 190, 191, 192, 193, 194, 195, 196 comprises a solenoid valve. The dispensing valves 190, 191, 192, 193, 194, 195, 196 are each coupled via a control line 125 to the controller 100.

As shown in FIG. 5, the dispensing valve 190 controls the flow of beverage out of the brewing device 30. Likewise, the dispensing valves 191, 192, 193, 194, 195, 196 control the flow of brewed beverage into the receptacles 60. Thus, by selectively operating specific combinations of the valves 190, 191, 192, 193, 194, 195, 196 the receptacle 60 or receptacles 60 into which brewed beverage flows or is dispensed can be precisely controlled and monitored. For example, if it were desired to dispense brewed beverage into receptacle 60A in FIG. 5, valves 190, 191 and 193 would be operated and valves 192, 194, 195, and 196 would remain closed. That is, the controller 100 would transmit a signal over the control lines 125 to cause the dispensing valves 190, 191, and 193 to open automatically. Similarly, if it were desired to dispense brewed beverage into receptacle 60B, valves 190, 191, and 192 would be operated and valves 193, 194, 195, and 196 would remain closed. If it were desired to dispense brewed beverage into receptacle 60C, dispensing valves 190, 195, and 196 would be operated and valves 191, 192, 193, and 194 would remain closed. Likewise, if it were desired to dispense brewed beverage into receptacle 60D, valves 190, 194, and 196 would be operated and valves 191,192, 193, and 195 would remain closed.

Accordingly, the controllable dispense valve arrangement 70 allows selective dispensing of brewed beverage into selected receptacles 60. Advantageously, this means that different types of brewed beverage can be dispensed to different receptacles 60, that the receptacles 60 can be refilled independently or refilled simultaneously as desired. Moreover, unlike the prior art in which a receptacle 60 had to be moved under a single dispensing spout to receive brewed beverage, the receptacles 60 can all be filled without moving from their fixed positions within the housing 20. This, in turn, increases the efficiency and simplifies the operation of the automatic beverage brewing apparatus 10.

Attention will now be directed to the controllable outlet valve arrangement 80 and FIGS. 3 and 5. It will be recalled that the controllable outlet valve arrangement 80 controls the flow of the brewed beverage retained in each of the receptacles 60 out of the receptacles 60. The controllable outlet valve arrangement 80 comprises outlet valves 82 positioned in the outlets of each of the receptacles 60. Preferably, these outlet valves 82 comprise electrically operated valves, such as solenoid valves. Each of the outlet valves 82 is coupled to the controller 100, which controls the activation of the valves 82. It will be recalled that the controller 100 controls operation of the outlet valves 82 via the control lines 130. The control lines 30 are connected to the contacts 170 provided for each receptacle 60.

The use of electrically operated valves in the present invention advantageously means that brewed beverage may be automatically dispensed from each of the receptacles 60. Moreover, by using the weight control signals generated by the weight sensing device 150, the controller 100 may controllably operate the outlet valves 82 so that selected quantities, e.g., small, medium or large, of brewed beverage arc automatically dispensed from the receptacles 60. Automatic dispensing provides further advantages in that wastage and spillage of brewed beverage are avoided, mistakes as to the type of beverage served are minimized, and efficiency is improved. Additionally by making the dispensing automatic and putting dispensing under the control of the controller 100, the quality of the beverage served can be enhanced. For example, the controller 100 can select the receptacle 60 with the freshest brewed beverage for dispensing to a customer; it can ensure that only receptacles 60 having a sufficient amount of brewed beverage retained therein are selected for dispensing, thereby eliminating the need for mixing beverage from two different receptacles 60 to produce a selected quantity of beverage. Thus, situations in which poor flavor brewed beverage is served to a customer, resulting from either a beverage being too old or mixing of beverage from two different receptacles 60 are avoided.

Each of the valves 82 of the controllable outlet valve arrangement 80 is associated with a front faucet 200. Specifically, each of the receptacles 60 includes a front faucet 200 through which brewed beverage retained in the receptacle 60 is dispensed. The outlet valves 82, thus, control the flow of beverage out of the receptacles 60 and through the faucets 200. As indicated schematically in FIG. 1, the front faucets 200 protrude from the housing 20 so that they are positioned over a dispensing area 24 on the housing 20.

In the preferred embodiment of the present invention, the front faucets 200 may only be operated electronically. That is, it is preferred that only the controller 100 be able to operate the faucets 200 via the valves 82 and control lines 130. Thus, in the preferred embodiment of the present invention, brewed beverage is dispensed electronically and automatically. By having only automatic dispensing of brewed beverage, operational efficiency is improved. Additionally, incorrect dispensing, and dispensing at inappropriate times are avoided.

Figure 6:
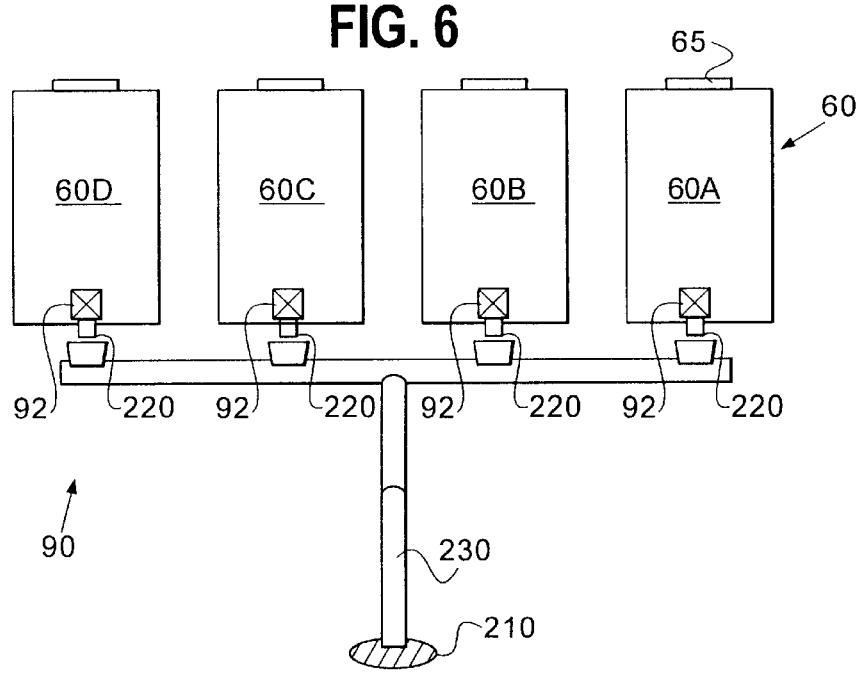
FIG. 6 is a diagrammatic rear elevational view of a disposal system for dumping brewed beverage used in the automatic beverage brewing apparatus of the present invention.

Attention will now be directed to the controllable disposal valve arrangement 90 of the present invention and FIGS. 3 and 6. The controllable disposal valve arrangement 90 controls the flow of beverage out of the receptacles 60 and to a drain 210 (FIG. 6). Thus, the controllable disposal valve arrangement 90, for example, controls the flow of brewed beverage out of a receptacle 60 during an emptying operation, at the beginning of a cleaning operation, or at the beginning of a refill cycle. The controllable disposal valve arrangement 90 comprises disposal valves 92. Preferably, the disposal valves 92 are electrically operated valves such as solenoid valves. One valve 92 is associated with each of the receptacles 60 and positioned in a discharge outlet of the receptacles 60. In the preferred embodiment of the present invention, each of the valves 92 is coupled to a rear faucet 220 on the receptacles 60. As shown in FIG. 3, the rear faucets 220 protrude from a rear wall of the receptacles 60. Thus, the disposal valves 92 control the flow of brewed beverage out of the receptacles 60, through the rear mounted faucets 220. Brewed beverage discharged from the rear faucets 220 flows through a common funnel 230 connected to the drain (FIG. 6). Each of the disposal valves 92 of the controllable disposal valve arrangement 90 are coupled to the controller 100 via the control lines 135.

The use of electrically operated valves 92 to control the emptying of the receptacles 60 advantageously means that the contents of the receptacles 60 can be dumped automatically, without being moved from the housing 20. Thus, it is not necessary to rely on an operator to monitor the age of the beverage or to lift a receptacle out and empty it. This reduces the likelihood that old brewed beverage will be served to a consumer. It also avoids sloshing or spilling of brewed beverage during the emptying operation and avoids physical strain on the operator. Spilling of course cannot only create an unhygienic mess, but also could possibly damage the apparatus should the beverage splash onto electrical components of the machine. Additionally, by using the timer control signals, the controller 100 can operate the valves 92 to cause the contents of a receptacle 60 to be dumped as soon as the contents become too old. Thus, refill operations can begin without delay, helping to ensure that there is always brewed beverage ready for serving.

It should be noted that the provision of separate front and rear faucets 200, 220 for dispensing and dumping operations respectively, provides important advantages. In particular, such an arrangement is more hygienic, as old, stale brewed beverage or dirty cleaning water does not contact the front dispensing faucets 200. Such an arrangement also prevents the serving of brewed beverage intended for disposal to a consumer. Specifically, if dumping occurred through the same faucet used for dispensing, an operator might not realize that the brewed beverage coming out of a receptacle 60 was intended for disposal and might inadvertently serve such brewed beverage to a customer.

Reference is now invited to FIG. 7, which is an overall control schematic of the present invention. As illustrated in FIG. 7, the controller 100 is connected to each of the components of the automatic beverage brewing apparatus 10 for controlling their operation. In particular, the controller 100 controls the operation of each of the components of the brewing apparatus 10 in accordance with preentered instructions or a predetermined program stored in its memory via an appropriate one of the control lines. For example, the controller 100 is connected to the brewing device 30, brewing substance dispenser 40, water delivery system 50 via control lines 105, 110, and 115 so that selected quantities of selected types of beverage are automatically brewed. The controller 100 is also coupled to the timer 140 over control line 240. The timer 140 registers when each batch of beverage is brewed, monitors the age of the batch retained within a receptacle 60, and relays this information to the controller 100 over the control line 240. In this regard, the timer 140 is coupled to each of the receptacles 60 via control lines 250. Coupling of the controller 100 to the timer 140 allows the controller 100 to monitor the age of the brewed beverage retained in a receptacle 60 (i.e, time elapsed since brewing) and determine in accordance with preset criteria whether a dumping operation should be performed.

The controller 100 is coupled to the controllable dispense valve arrangement 70, i.e the dispense valves 190, 191, 192, 193, 194, 195, 196 via control lines 125 for controlling to which receptacles 60 brewed beverage is dispensed from the brewing device 30, the type of brewed beverage dispensed to a receptacle 60, and the quantity of brewed beverage dispensed to a receptacle 60. The controller 100 bases these decisions in part on the weight control signals it receives over control lines 165 from the weight sensing devices 150. It will be recalled that the weight sensing device 150 is coupled to each of the receptacles for sensing the weight of brewed beverage retained therein. Specifically, coupling of the controller 100 to the weight sensing device 150 allows the controller 100 to monitor the volume of brewed beverage retained in each of the receptacles 60 and helps the controller 100 determine, for example, whether a refill operation should be performed.

The controller 100 is coupled to the controllable outlet valve arrangement 80 via control lines 130 for controlling from which receptacle or receptacles 60 beverage should be dispensed. The controller 100 determines the receptacle or receptacles 60 from which beverage should be dispensed based on such criteria as the type, age, and availability of brewed beverage retained in a receptacle 60.

The controller 100 is coupled to the controllable disposal valve arrangement 90, i.e the disposal valves 92, via control lines 135 for controlling the emptying of brewed beverage retained therein. The controller 100 controls the emptying in accordance with the age of the brewed beverage retained therein.

The operation of the present invention will now be described by presenting specific examples of the manner in which the automatic beverage brewing apparatus 10 can function. The following examples are not intended to limit the scope of the present invention. Rather, the examples are merely illustrative of the numerous capabilities and many unique features of the present invention. In the following examples, the term "coffee" is used with regard to the beverage brewing substance and the brewed beverage; however it will be understood by those skilled in the art that brewing substances other than coffee may be used in the present invention and that other beverages could be brewed.

The automatic beverage brewing apparatus 10 can be programmed to prepare both decaffeinated and caffeinated coffee and to distribute the decaffeinated coffee to receptacles 60A and 60B (FIG. 5), for example, and the caffeinated coffee to receptacles 60C and 60D, for example. This mode of operation can be chosen by entering appropriate selections through the keyboard 145. Alternatively, an appropriate program can be stored in the memory of the controller 100, which would cause the automatic beverage brewing apparatus 10 to function in this manner. The program could then be activated by the inputting of a single key. In this situation, the controller 100 would activate the brewing substance dispenser 40 over the control line 110 to dispense decaffeinated coffee to the brewing device 30 and the water delivery system 50 to introduce water to the brewing device 30. The brewing device 30 would then be operated over control line 105 to produce decaffeinated coffee. The dispensing valves 190, 191, 192, and 193 would then be operated so that decaffeinated coffee is distributed to receptacles 60A and 60B. The controller 100 would then activate the brewing substance dispenser 40 over control line 110 to dispense caffeinated coffee to the brewing device 30 and the water delivery system 50 to introduce water to the brewing device 30. The brewing device 30 would then be operated over control line 105 to produce caffeinated coffee. Dispensing valves 190, 194, 195, and 196 would then be operated so that caffeinated coffee is distributed to receptacles 60C and 60D.

The automatic beverage brewing apparatus 10 can be programmed so that coffee may be dispensed only if certain criteria are met. Specifically, in response to a dispense button corresponding to a specific receptacle 60 being pushed on the key board 145, the controller 100 would first determine the age of the coffee retained within the selected receptacle 60. The controller 100 would then determine whether coffee were currently being dispensed into the selected receptacle 60 from the brewing device 30. The controller 100 would also check whether coffee were currently being dumped from the selected receptacle 60 and whether the receptacle 60 were being rinsed out with water. The controller 100 would activate the controllable outlet valve arrangement 80 to cause dispensing only if the coffee were less than a predetermined age (i.e, not "too old"), no dispensing into the selected receptacle 60 from the brewing device 30 were currently taking place, no dumping were taking place, and no rinsing were taking place.

The automatic beverage brewing apparatus 10 can be programmed to display the volume, age, and type of coffee contained within each of the receptacles 60. In particular, this information could be provided on a LED display above each of the receptacles 60. It will be recalled that the weight sensing device 150 provides the controller 100 with inventory information, the timer 140 monitors the time elapsed since brewing of a batch of beverage, and the sequence of valves 190, 191, 192, 193, 194, 195, 196 operated determines whether and what type of brewed beverage is dispensed into a receptacle.

The automatic beverage brewing apparatus 10 can be programmed to monitor and store the consumption rate of coffee as a function of the day of the week, date and time of day. The weight sensing devices 150 provide the controller 100 with information on the quantity of coffee consumed. The timer 140 provides the controller 100 with timing information. A simple algorithm may be stored in the memory of the controller 100 to allow it to calculate the consumption rate. The controller 100 could also be programmed to use this information so that at a particular time on a particular day of the week the controller 100 automatically causes a quantity of coffee to be brewed corresponding to the quantity consumed at that time on that day in a previous week.

The automatic beverage brewing apparatus 10 could be programmed or tailored to meet an owner's preferences. For example, it could be programmed to have 6 gallons of caffeinated and 2 gallons of decaffeinated coffee ready by 6:00 am. It could be programmed to cause the coffee within a receptacle 60 to be dumped automatically, as soon as the time elapsed since brewing exceeded 90 minutes. The automatic beverage brewing apparatus 10 could be programmed to maintain 4 gallons of decaffeinated coffee and 4 gallons of caffeinated coffee during typical dinner hours e.g. five to eight p.m. It could be programmed to allow refilling of a receptacle 60 having an amount of coffee remaining therein only if the coffee remaining in the receptacle 60 is less than 90 minutes old. The apparatus 10 could be programmed to allow refilling of a receptacle 60 having an amount of coffee left therein only if the resulting ratio of "new coffee" to old coffee is at least 50/50. The automatic beverage brewing apparatus 10 could be programmed to provide each receptacle 60 with a 15 second rinse with water, after a dumping or emptying operation is performed. The apparatus 10 could be programmed to fill each receptacle 60 with hot water after closing of a store (i.e during the night), and automatically empty and refill each receptacle 60 with hot water on an hourly basis until its opening time. The apparatus could be programmed to preheat each receptacle 60 by refilling it with hot water 30 minutes prior to opening of the store. This advantageously would essentially eliminate any heat up time of the brewed beverage dispensed into the receptacle 60.

A modem could be hooked up to the automatic beverage brewing apparatus 10. This would allow remote control of the apparatus 10. That is, control signals, could be transmitted to the apparatus 10 over the telephone line. These control signals could be used, for example, to control the types and quantities of brewed beverage produced.

The apparatus 10 could be connected to remote receptacles via hoses. Such remote receptacles could provide a back-up supply of coffee, should demand exceed expectations.

Thus, an improved automatic beverage brewing apparatus 10 has been described. The automatic beverage brewing apparatus 10 of the present invention fully automates the steps involved in the preparation and dispensing of brewed beverage. Accordingly, the apparatus 10 of the present invention vastly improves the efficiency of the preparation and dispensing of a brewed beverage. Moreover, because the need for operator intervention is minimized, the pitfalls and errors associated with manual labor are avoided. Furthermore, the many unique features of the present invention, such as the weight sensing devices 150, the controllable dispense valve arrangement 70 and the automatic front outlet and rear disposal 82, 92 greatly enhance the quality of the brewed beverage produced and the utility of the apparatus 10.

What is claimed is:

1. An automatic beverage brewing apparatus including a controllable brewing device and a controllable brewing substance dispenser communicating with said brewing device, said beverage brewing apparatus comprising:
    a housing;
    at least one receptacle retained on said housing proximate to said brewing device for receiving a brewed beverage therefrom;
    a weight sensing device associated with each of said receptacles, each said weight sensing device supporting a receptacle and being adapted to sense the weight of brewed beverage retained within a receptacle and generate a weight control signal corresponding to the sensed weight;
    a controller for receiving said weight control signals; and
    an indicator coupled to said controller;
    said controller determining in response to each weight control signal the volume of brewed beverage retained within a receptacle, said controller generating volume control signals corresponding to said determined volumes, said indicator receiving said volume control signals and displaying in response to said volume control signals, the volume of brewed beverage retained within each of the receptacles.

2. An automatic beverage brewing apparatus including a controllable brewing device and a controllable brewing substance dispenser communicating with said brewing device, said beverage brewing apparatus comprising
    a housing;
    at least one receptacle retained on said housing proximate to said brewing device for receiving a brewed beverage therefrom;
    a controllable outlet valve coupled to and communicating with each of said receptacles for controllably dispensing a quantity of brewed beverage from said receptacle;
    a controllable disposal valve coupled to and communicating with each of said receptacles for controllably emptying said receptacle of brewed beverage; and
    a controller coupled to said controllable outlet and disposal valves, said controller selectively operating said controllable outlet valves and said disposal valves in accordance with one of dispensing from and emptying said receptacles.

3. An automatic beverage brewing apparatus according to claim 2 in which said controllable outlet valves are retained on the front of said housing and said controllable disposal valves are retained on the rear of said housing.

4. An automatic beverage brewing apparatus according to claim 2 in which said controller is adapted to close each of said controllable outlet valves to prevent dispensing of brewed beverage therethrough, when said receptacle receives brewed beverage from said brewing device.

5. An automatic beverage brewing apparatus according to claim 2 in which said controller is adapted to close each of said controllable outlet valves to prevent dispensing of brewed beverage therethrough, when said controllable disposal valve of said receptacle is operated to empty said receptacle of brewed beverage through said controllable disposal valve of said receptacle.

6. An automatic beverage brewing apparatus according to claim 2 further comprising:
    a timer coupled to each of said receptacles and to said brewing device, each of said timers being adapted to measure the time elapsed since brewing of a beverage retained in the receptacle to which it is coupled, and to generate a time control signal corresponding to the time elapsed since brewing of the beverage retained in the receptacle to which it is coupled; and
    said controller receiving said timer control signals and controllably operating said controllable outlet valves in accordance with the time control signals so that if the time elapsed since the brewing of a beverage retained in a receptacle exceeds a first predetermined time, the controllable outlet valve of said receptacle is closed to prevent dispensing of brewed beverage from the controllable outlet valve of said receptacle.

7. An automatic beverage brewing apparatus according to claim 6 in which said controller is adapted to operate said controllable disposal valves in accordance with said time control signals so that if the time elapsed since the brewing of a beverage retained in a receptacle exceeds said first predetermined time, the controllable disposal valve corresponding to that receptacle is operated to empty the receptacle of brewed beverage.

8. An automatic beverage brewing apparatus according to claim 2 in which said controller is adapted to sense when said receptacles are being cleaned and to close said controllable outlet valves to prevent dispensing of brewed beverage therethrough when said receptacles are being cleaned.

9. An automatic beverage brewing apparatus including a controllable brewing device and at least one controllable brewing substance dispenser communicating with said brewing device for dispensing at least one type of brewing substance into said brewing device to produce at least one type of brewed beverage, said beverage brewing apparatus comprising:
    a housing;
    at least one receptacle retained in the housing for receiving a brewed beverage from said brewing device and retaining said brewed beverage;
    a controllable dispensing valve coupled to each of said receptacles for controlling the flow of a brewed beverage from the beverage brewing device to a corresponding receptacle;
    a controllable outlet valve coupled to each of said receptacles, each of said controllable outlet valves being coupled to one of said receptacles for controllably dispensing a brewed beverage from said receptacle;
    a controller coupled to said brewing device, said brewing substance dispensers, said dispensing valves and said outlet valves, said controller controllably operating said brewing substance dispensers, said brewing device and said dispensing valves so that a predetermined type of brewed beverage is dispensed to a predetermined receptacle.

10. An automatic beverage brewing apparatus according to claim 9 in which each of said outlet valves comprises a solenoid valve.

11. An automatic beverage brewing apparatus according to claim 9 in which each of said dispensing valves comprises a solenoid valve.

12. An automatic beverage brewing apparatus according to claim 9 further comprising a timer coupled to each of said receptacles and coupled to said brewing device, each of said timers being adapted to measure the time elapsed since brewing of a beverage retained in the receptacle to which it is coupled, and to generate a time control signal corresponding to the time elapsed since brewing of the beverage retained in the receptacle to which it is coupled, said controller receiving said timer control signals and controllably operating said dispensing valves in accordance with the timer control signals so that if the time elapsed since the brewing of a beverage retained in a receptacle exceeds a first predetermined time, the dispensing valve corresponding to that receptacle is closed to prevent dispensing of additional brewed beverage into the receptacle.

13. A beverage brewing apparatus according to claim 12 further comprising a disposal valve coupled to each of said receptacles for emptying said receptacles of brewed beverage, said controllers being adapted to operate said disposal valves to empty said receptacles of brewed beverage when the time elapsed since brewing of the beverage exceeds a second predetermined time period, and to operate said dispensing valves to refill said receptacles with brewed beverage after said emptying operation has been performed.

14. A beverage brewing apparatus including a brewing device and a brewing substance dispenser communicating with said brewing device, said beverage brewing apparatus comprising a housing;

at least one receptacle retained in the housing for receiving a brewed beverage from said brewing device and retaining said brewed beverage;

a controllable dispensing valve coupled to each of said receptacles, each of said controllable dispensing valves being coupled to one of said receptacles for controlling the flow of a brewed beverage from the beverage brewing device to said receptacle;

a controllable outlet valve coupled to and communicating with each of said receptacles for controllably dispensing brewed beverage from said receptacles;

a controllable disposal valve coupled to each of said receptacles for automatically emptying said receptacles of brewed beverage;

a weight sensing device coupled to said receptacles, each said weight sensing device supporting a receptacle and being adapted to sense the weight of brewed beverage retained within a receptacle and generate a weight control signal corresponding to the sensed weight; and a controller receiving said weight control signals, said controller determining in response to each weight control signal the volume of brewed beverage retained within a receptacle, said controller being coupled to said dispensing valves, outlet valves, and said disposal valves, said controller selectively operating said dispensing valves, outlet valves, and said disposal valves in accordance with said determined volumes.

15. A beverage brewing apparatus according to claim 14 further comprising:

a timer coupled to each of said brewing devices, each of said timers also being coupled to one of said receptacles, each of said timers being adapted to measure the time elapsed since brewing of a beverage retained in the receptacle to which it is coupled, and to generate a time control signal corresponding to the time elapsed since brewing of the beverage retained in the receptacle to which it is coupled;

said controller receiving said timer control signals and controllably operating said dispensing valves in accordance with the timer control signals so that if the time elapsed since the brewing of a beverage retained in a receptacle exceeds a first predetermined time, the dispensing valve corresponding to that receptacle is closed to prevent dispensing of additional brewed beverage into the receptacle.

16. A beverage brewing apparatus according to claim 15 in which said control means is adapted to determine rates of beverage consumption at selected times of the day in response to said weight control signals and said time control signals and generate beverage consumption data corresponding to said determined beverage consumption rates.

17. A beverage brewing apparatus according to claim 16 further comprising memory means for storing said beverage consumption data.

18. A beverage brewing apparatus according to claim 17 in which said control means is adapted to retrieve said beverage consumption data from the memory means and operate said brewing substance dispensing means, said brewing beverage means, said inlet valves, said outlet valves, said beverage brewing means outlet valve and said disposal valves in accordance with said beverage consumption data so that a quantity of beverage produced at a particular time corresponds to the quantity consumed at that particular time on a previous day.

* * * * *